United States Patent
Lips

(10) Patent No.: US 9,678,512 B2
(45) Date of Patent: *Jun. 13, 2017

(54) SYSTEM AND METHOD FOR INJECTING A FLUID ADDITIVE INTO A FLUID DISPENSATION SYSTEM

(71) Applicant: Virid Services, LLC, Parker, CO (US)

(72) Inventor: Jon Lips, Parker, CO (US)

(73) Assignee: Virid Services, LLC, Parker, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,138

(22) Filed: Apr. 13, 2015

(65) Prior Publication Data
US 2016/0011603 A1    Jan. 14, 2016

Related U.S. Application Data

(63) Continuation of application No. 14/059,010, filed on Oct. 21, 2013, now Pat. No. 9,008,848, which is a
(Continued)

(51) Int. Cl.
| | |
|---|---|
| *G05D 11/02* | (2006.01) |
| *B05B 12/00* | (2006.01) |
| *B05B 7/28* | (2006.01) |
| *A01C 23/04* | (2006.01) |
| *B05B 1/20* | (2006.01) |
| *B05B 7/32* | (2006.01) |
| *A01C 23/00* | (2006.01) |

(Continued)

(52) U.S. Cl.
CPC ............ *G05D 11/02* (2013.01); *A01C 23/007* (2013.01); *A01C 23/042* (2013.01); *A01M 7/0092* (2013.01); *B05B 1/20* (2013.01); *B05B 7/28* (2013.01); *B05B 7/32* (2013.01); *B05B 12/004* (2013.01); *F17D 3/01* (2013.01); *B05B 12/14* (2013.01); *Y10T 137/0324* (2015.04); *Y10T 137/87676* (2015.04)

(58) Field of Classification Search
None
See application file for complete search history.

(56) References Cited

U.S. PATENT DOCUMENTS

| | | | | |
|---|---|---|---|---|
| 4,917,304 A | * | 4/1990 | Mazzei | F17D 3/12 239/304 |
| 5,222,027 A | * | 6/1993 | Williams | B67D 7/744 222/1 |

(Continued)

*Primary Examiner* — Sean Shechtman

(57) ABSTRACT

A method for operating a fluid additive control system to inject a fluid additive into a fluid dispensation system is provided. The method includes receiving a first control signal indicating that a fluid dispensation device within the fluid dispensation system is active, and determining a fluid additive quantity based upon the identity of the fluid dispensation device. The method also includes activating a fluid additive injection system, where the fluid additive dispensation system injects the fluid additive into the fluid dispensation system in response to the activation. The method further includes receiving a second control signal from the fluid additive injection system when the fluid additive quantity for the zone has been injected into the fluid dispensation system, and deactivating the fluid additive dispensation system in response to the second control signal.

6 Claims, 13 Drawing Sheets

Related U.S. Application Data continuation of application No. 12/568,907, filed on Sep. 29, 2009, now Pat. No. 8,565,925.

(51) Int. Cl.
 *A01M 7/00* (2006.01)
 *F17D 3/01* (2006.01)
 *B05B 12/14* (2006.01)

(56) References Cited

U.S. PATENT DOCUMENTS 5,366,159 A * 11/1994 Childers .............. A01C 23/042
 137/564.5
9,008,848 B2 * 4/2015 Lips .................... A01C 23/042
 700/283

* cited by examiner

SYSTEM AND METHOD FOR INJECTING A FLUID ADDITIVE INTO A FLUID DISPENSATION SYSTEM

RELATED APPLICATIONS

This application is a continuation of and claims priority to U.S. patent application Ser. No. 14/059,010, filed on Oct. 21, 2013, and issued as U.S. Pat. No. 9,008,848 on Apr. 14, 2015, which itself is a continuation and claims priority to U.S. patent application Ser. No. 12/568,907, filed on Sep. 29, 2009, and issued as U.S. Pat. No. 8,565,925 on Oct. 22, 2014. Both are hereby incorporated by reference in their entirety.

TECHNICAL BACKGROUND

Fluid dispensation systems are used in a wide variety of enterprises. For example, they are used to irrigate farmland, water residential lawns, trees, and shrubs, as well as for a variety of industrial uses. Fluid dispensation systems typically include a plurality of fluid dispensation devices, such as sprinklers, that may be arranged into zones.

Many fluid dispensation systems typically operate through the use of valves directing a pressurized fluid to the differing fluid dispensation devices or zones. These valves are often controlled electronically, by anything from a simple sprinkler system controller to a large computer system. Often it is desirable to inject additives in various quantities into the fluid that is being distributed.

OVERVIEW

In various embodiments, methods and systems are provided for injecting a fluid additive into a fluid dispensation system. In an example embodiment, a method for operating a fluid additive control system to inject a fluid additive into a fluid dispensation system is provided. The method includes receiving a first control signal indicating that a fluid dispensation device within the fluid dispensation system is active, and determining a fluid additive quantity based upon the identity of the fluid dispensation device.

The method also includes activating a fluid additive injection system, where the fluid additive dispensation system injects the fluid additive into the fluid dispensation system in response to the activation. The method further includes receiving a second control signal from the fluid additive injection system when the fluid additive quantity for the zone has been injected into the fluid dispensation system, and deactivating the fluid additive dispensation system in response to the second control signal.

In another example embodiment, a fluid additive control system for injecting a fluid additive into a fluid dispensation system is provided. The fluid additive control system includes a communication interface configured to receive and transmit control signals, and a processing system coupled to the communication interface. The processing system is configured to receive a first control signal through the communication interface indicating that a fluid dispensation device within the fluid dispensation system is active, and to determine a fluid additive quantity based on the identity of the fluid dispensation device.

The processing system is also configured to transmit a second control signal to a fluid additive injection system through the communication interface, where the second control signal activates the fluid additive dispensation system, and the fluid additive dispensation system injects the fluid additive into the fluid dispensation system in response to the activation. The processing system is further configured to receive a third control signal from the fluid additive injection system through the communication interface when the fluid additive quantity for the fluid dispensation device has been injected into the fluid dispensation system, and to transmit a fourth control signal to the fluid additive dispensation system through the communication interface in response to the second control signal, where the fourth control signal deactivates the fluid additive dispensation system.

In a further example embodiment, a fluid dispensation system is provided. The fluid dispensation system includes a fluid additive injection system, a fluid injection control system coupled to the fluid additive injection system, configured to control a quantity of fluid additive injected into the fluid dispensation system, and a fluid dispensation device coupled to the fluid additive injection system, configured to dispense a fluid from the fluid dispensation system when activated.

The fluid additive injection system includes a valve coupled to a pressurized fluid supply, configured to receive pressurized fluid from the pressurized fluid supply, and to open in response to a first control signal, and to close in response to a third control signal. The fluid additive injection system also includes a piston coupled to the first valve, configured move from an initial position and to inject fluid additive into the fluid dispensation system in response to pressurized fluid from the pressurized fluid supply passing through the first valve. The fluid additive injection system further includes a piston position sensor coupled to the piston, configured to send a second control signal to the fluid additive control system when the piston has injected a pre-determined quantity of the fluid additive into the fluid dispensation system.

The fluid injection control system is configured to detect an activation of the fluid dispensation device, transmit the first control signal to the valve in response to the first control signal, wherein the first control signal causes the valve to open, and to receive the second control signal from the piston position sensor. The fluid injection control system is also configured to transmit a third control signal to the valve in response to the second control signal, wherein the third control signal causes the valve to close, releasing the pressurized fluid, and allowing the piston to return to the initial position.

In another example embodiment, a method for operating a fluid dispensation system is provided. The method includes receiving a first control signal at a fluid injection control system signaling that a fluid dispensation device within the fluid dispensation system is active, and determining a fluid additive quantity based upon the identity of the fluid dispensation device.

The method also includes activating a valve coupled to a pressurized fluid supply in response to the first control signal, the valve configured to receive pressurized fluid from a pressurized fluid supply and transmit the pressurized fluid into a first piston cylinder coupled with a piston, where the pressurized fluid moves the piston from an initial position, the piston configured to inject fluid additive from a second piston cylinder into the fluid dispensation system in response to the pressurized fluid entering the piston cylinder. The method further includes transmitting a second control signal from a piston position sensor coupled to the piston to the fluid injection control system when the piston has injected the fluid additive quantity into the fluid dispensation system based on a position of the piston, and deactivating the valve in response to the second control signal, the valve configured to release the pressurized fluid from the first piston cylinder when deactivated, allowing the piston to return to the initial position.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
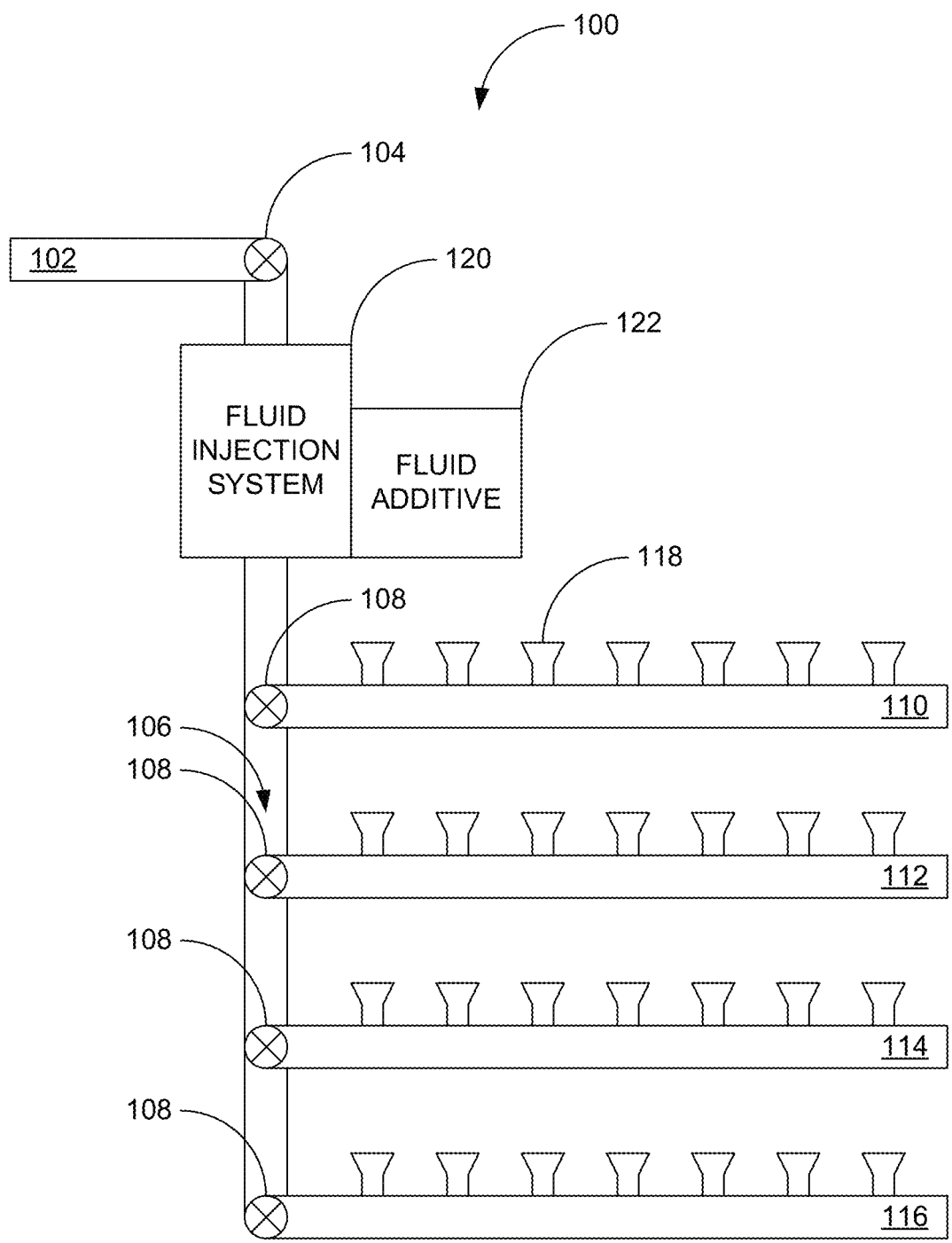
FIG. 1 is a block diagram illustrating a fluid dispensation system.

FIG. 1 is a block diagram illustrating fluid dispensation system 100. In this example fluid dispensation system 100, pressurized fluid 102 passes through backflow prevention valve 104, and fluid injection system 120 resulting in pressurized fluid plus additive 106. Fluid injection system 120 takes fluid additive 122 and adds it to the pressurized fluid. Pressurized fluid plus additive 106 is distributed to a plurality of fluid dispensation devices 118 (such as sprinklers or drip irrigation nozzles) through one of a plurality of valves 108.

This example fluid dispensation system 100 includes four zones 110, 112, 114, and 116 each of which is controlled by a valve 108. Each zone may include one or more fluid dispensation devices 118. Typically these valves are solenoid valves electrically controlled by a control system not illustrated in FIG. 1. One or more zones may be activated at any time and the pressurized fluid plus additive 106 flows through the appropriate valves 108 to the desired fluid dispensation devices 118. One example method for operating fluid injection system 120 is described below with respect to FIG. 2.

Figure 2:
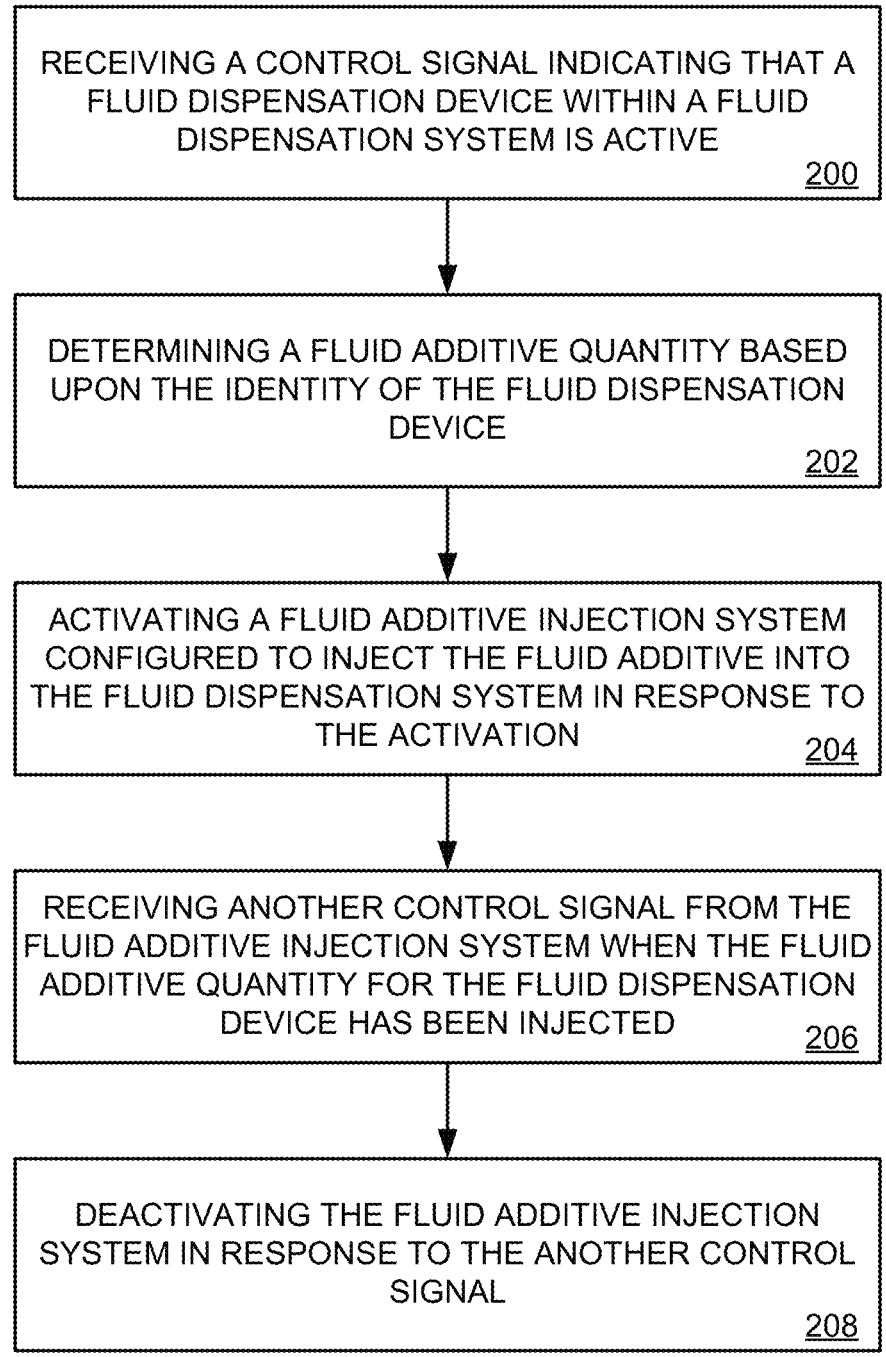
FIG. 2 is a flow chart illustrating a method for operating a fluid additive control system to inject a fluid additive into a fluid dispensation system.

FIG. 2 is a flow chart illustrating a method for operating a fluid additive control system to inject a fluid additive into fluid dispensation system 100. This example method may be performed by fluid injection system 120 in the fluid dispensation system 100 of FIG. 1. In this example method, a control signal indicating that a fluid dispensation device 118 within the fluid dispensation system 100 is received by the fluid additive control system (operation 200). Fluid dispensation devices may be sprinklers, sprayers, drip lines, multiple sprinklers or drip lines, or the like. In some examples, the control signal may indicate that one or more zones 110, 112, 114, and 116 have been activated within fluid distribution system 100.

The fluid additive control system determines a fluid additive quantity based upon the identity of the fluid dispensation device 118 (operation 202). Different fluid dispensation devices may require differing quantities of the fluid additive. The fluid additive control system may be programmed so that it dispenses different amounts of the fluid additive based on which devices or zones are active. The fluid additive control system may reside within fluid injection system 120 of FIG. 1.

The fluid additive control system activates a fluid additive injection system (operation 204). In response to the activation, the fluid additive injection system injects the fluid additive into the fluid dispensation system. The fluid additive injection system may reside within fluid injection system 120 of FIG. 1.

The fluid additive control system receives another control signal from the fluid additive injection system when the fluid additive quantity for the fluid dispensation device 118 or zone has been injected into the fluid dispensation system 100 (operation 206). In response to the additional control signal, the fluid additive control system deactivates the fluid additive injection system (operation 208).

Figure 3A:
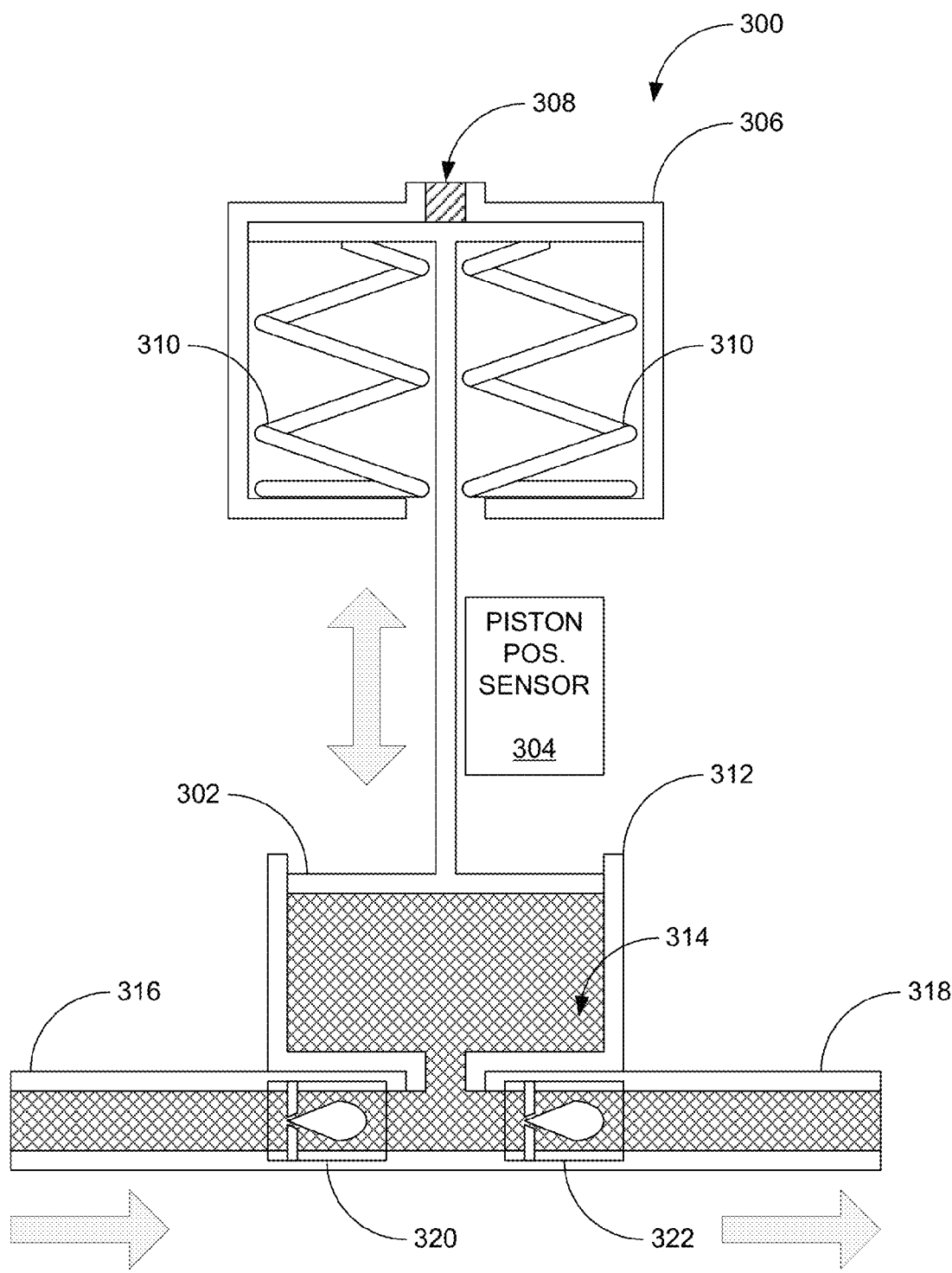
FIGS. 3A, 3B, and 3C are block diagrams illustrating a fluid additive injection system.
Figure 3B:
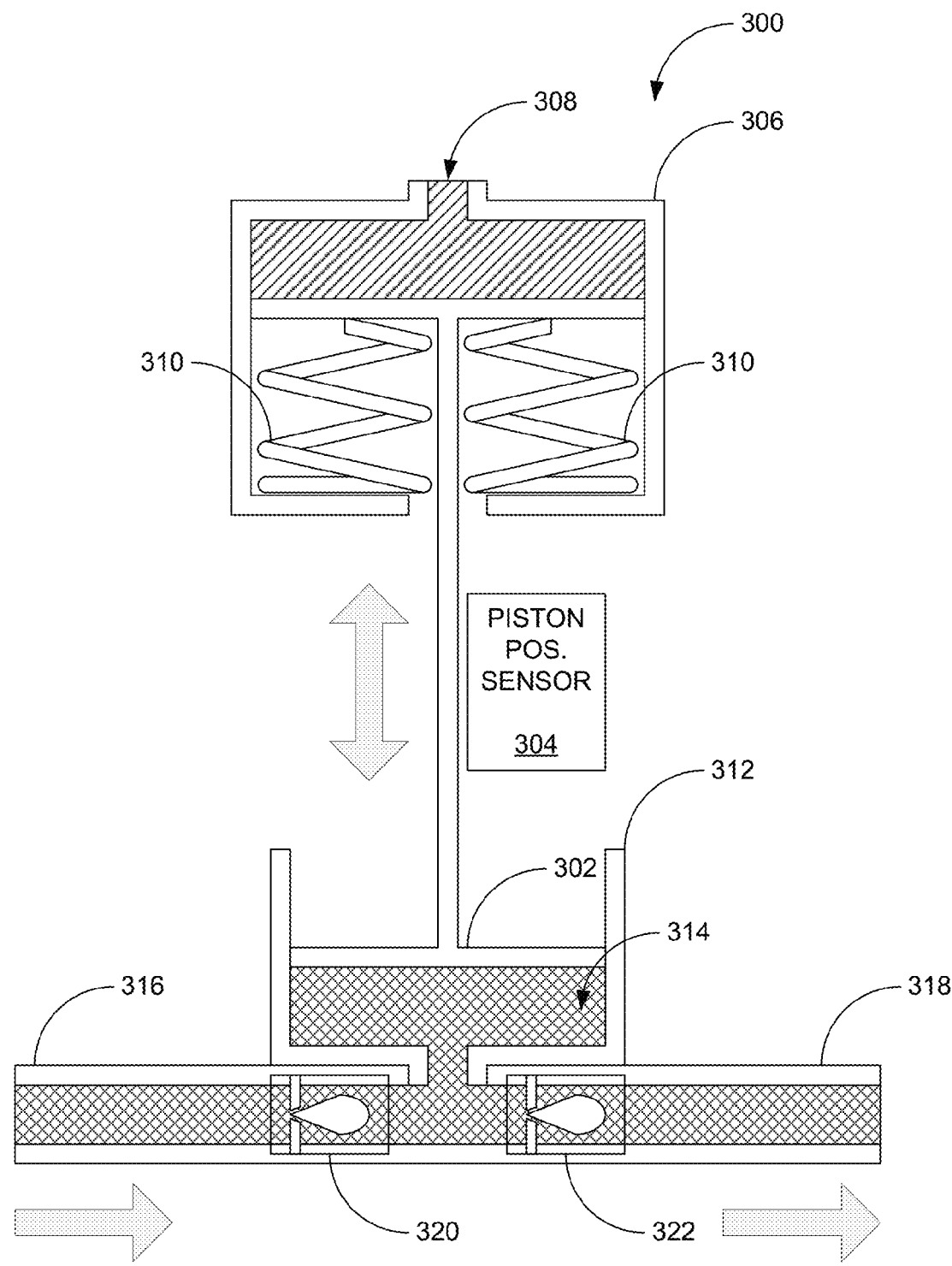
Figure 3C:
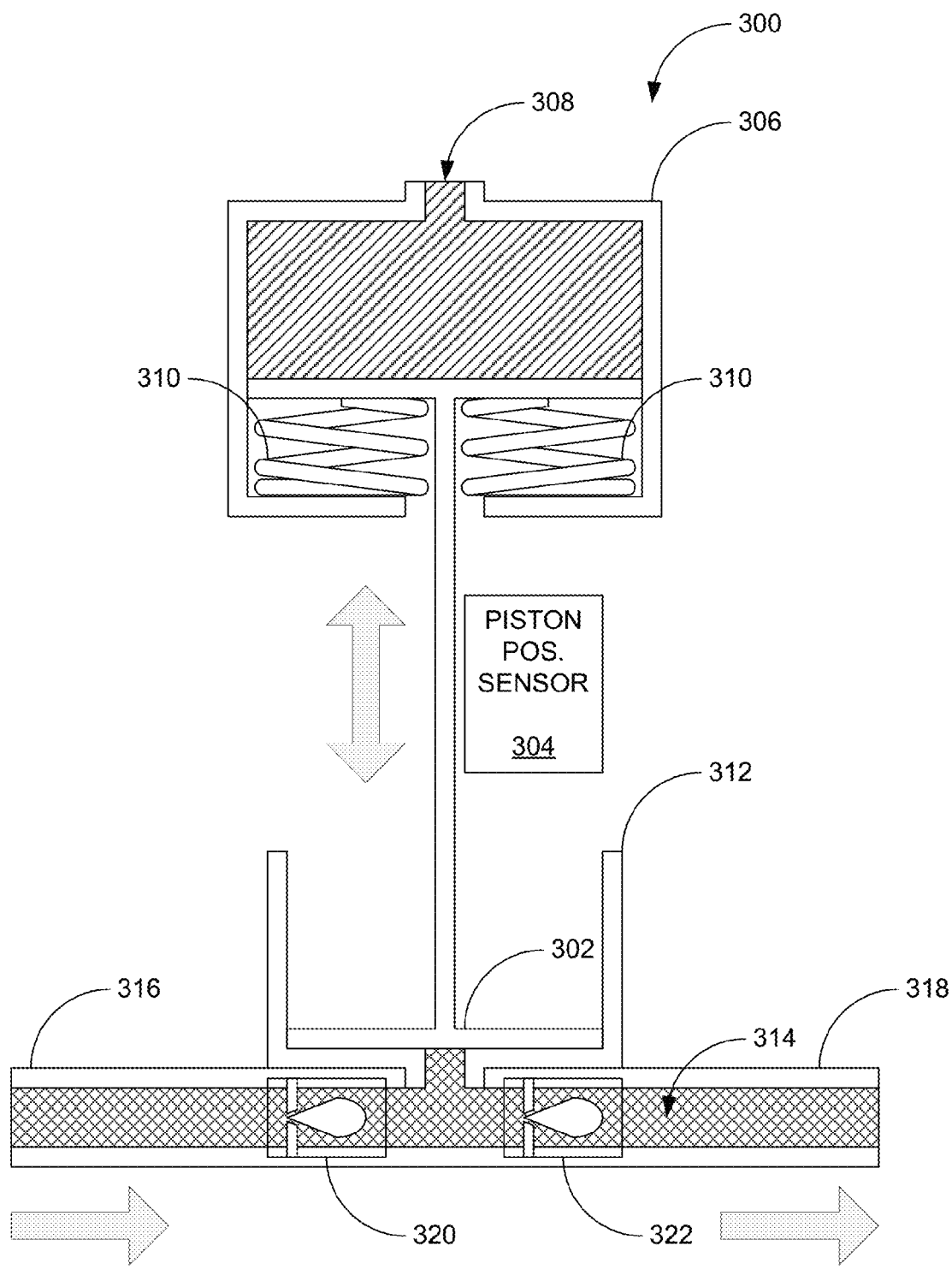

FIGS. 3A, 3B, and 3C are block diagrams illustrating a fluid additive injection system such resides within the fluid injection system 120 illustrated in FIG. 1. In this example embodiment, fluid additive injection system 300 includes piston 302, first piston cylinder 306, second piston cylinder 312, and piston position sensor 304. Fluid additive injection system is configured such that pressurized fluid 308 is available to flow into first piston cylinder 306.

Fluid additive 314 is received into second piston cylinder 312 through fluid additive input 316 and one-way valve 320. Piston 302 is shown in an initial position in FIG. 3A. In this initial position, pressurized fluid 308 has not yet been applied to the input of first piston cylinder 306 and resilient members 310 operate to hold the piston in this position. In this example, resilient members 310 are springs, however in other embodiments other resilient members such as a single spring, compressible solids, air bags, and the like may be used.

When pressurized fluid 308 is applied to first cylinder 306, the pressurized fluid overcomes the pressure exerted on piston 302 by resilient members 310 and piston 302 begins to move down. This example is illustrated by FIG. 3B. As piston 302 moves down, fluid additive 314 is ejected from second piston cylinder 312 and passes through one-way valve 322 to output 318. As piston 302 moves downward resilient members 310 are compressed, and piston position sensor 304 monitors the motion of piston 302.

Figure 7A:
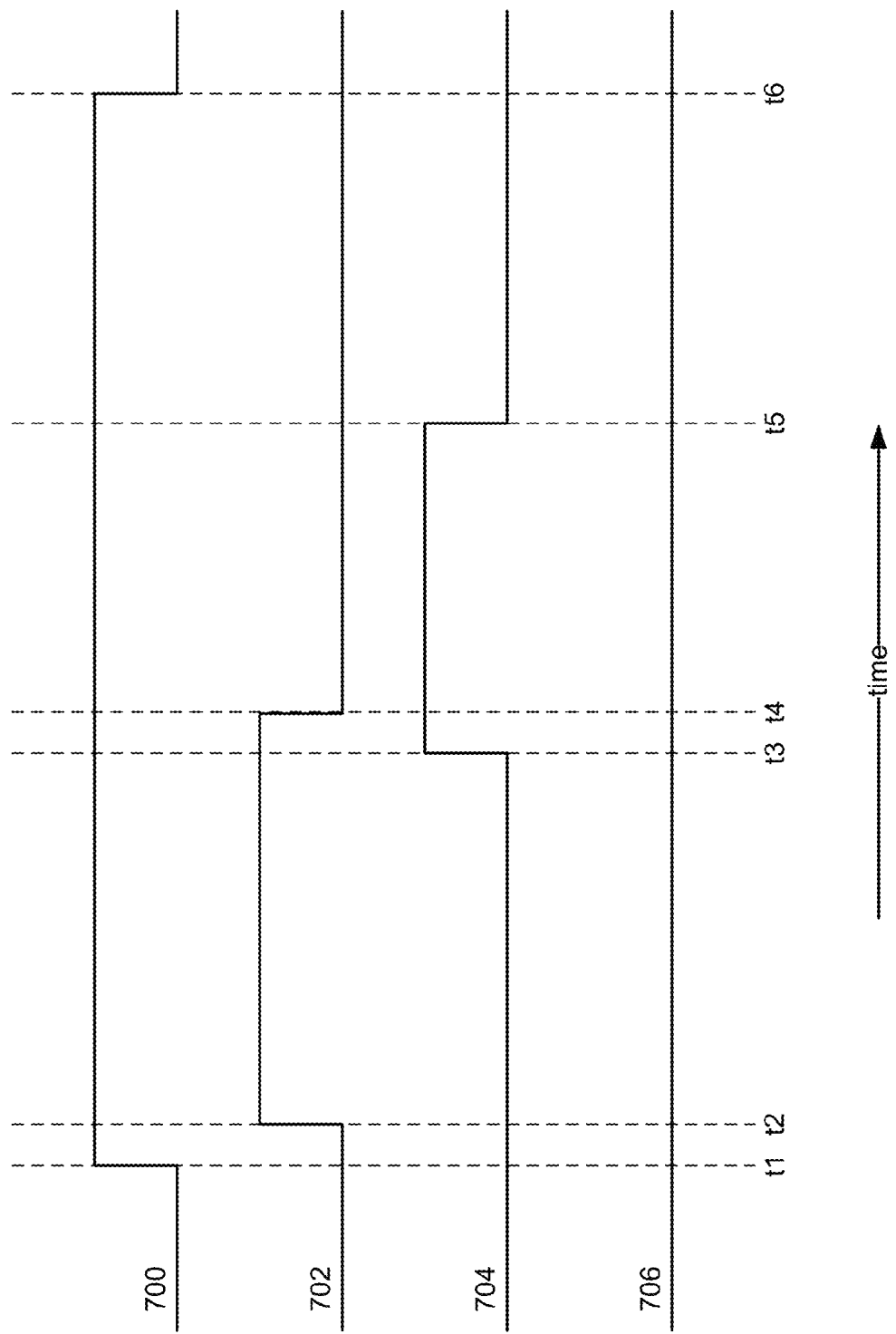
FIGS. 7A and 7B are illustrations of exemplary control signals used by a fluid additive control system.
Figure 7B:
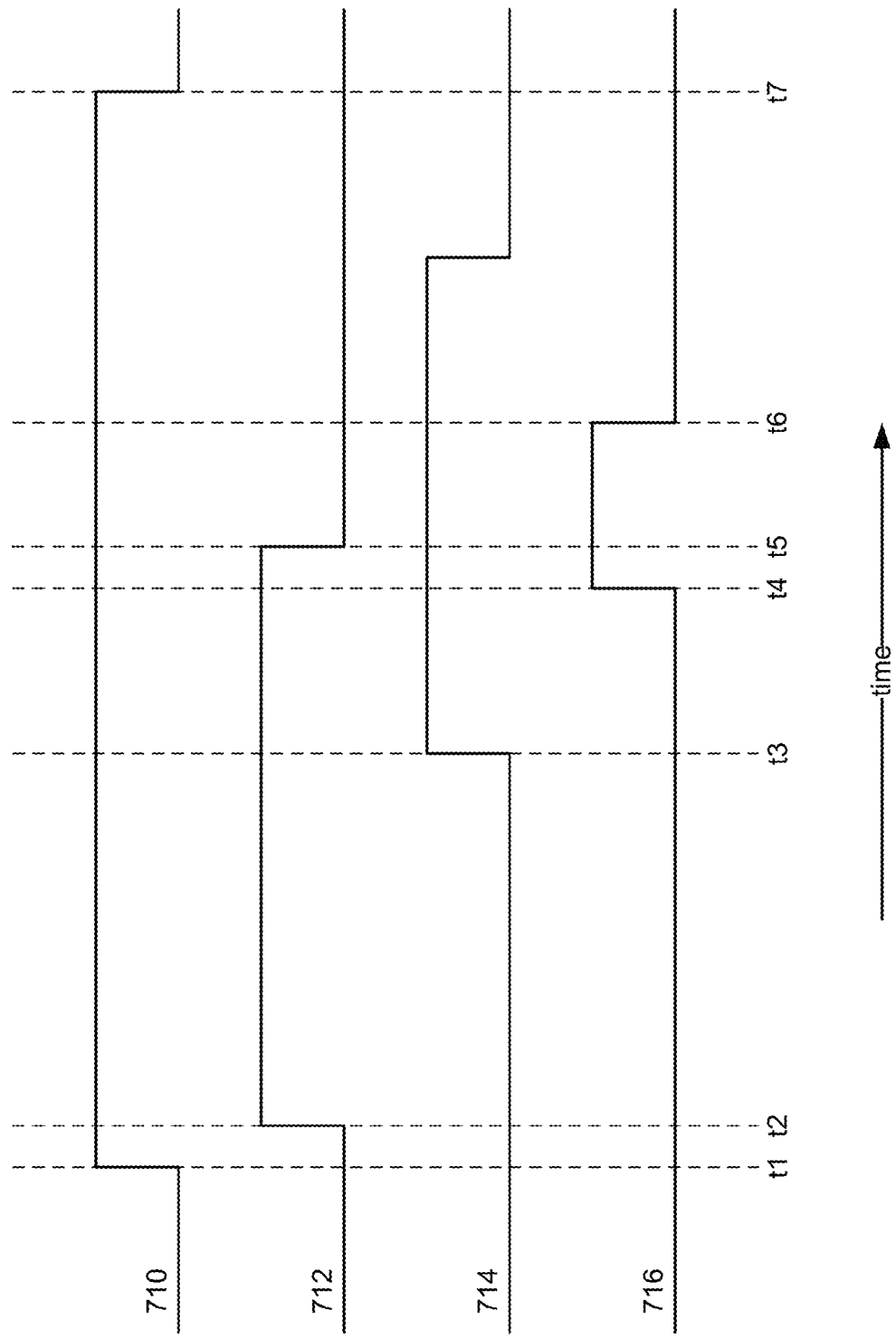

If piston 302 is allowed to travel to the bottom of second piston cylinder 312, most or all of fluid additive 314 within second piston cylinder 312 is injected into output 318 through one-way valve 322. This situation is illustrated in FIG. 3C. One-way valve 320 prevents fluid additive 314 from returning through input 316 of fluid injector system 300. At this point, or earlier, piston position sensor 304 will have determined the position of piston 302 and communicated this position to a fluid additive control system through control signals. Example control signals are illustrated in FIGS. 7A and 7B.

Once the proper amount of fluid additive 314 has been injected into the fluid dispensation system through output 318, the pressurized fluid 308 is shut off from first piston cylinder 306, and resilient members 310 act to return piston 302 to its initial position. As piston 302 returns to its initial position (illustrated in FIG. 3A) the portion of pressurized fluid 308 that was contained within first piston cylinder 306 is discarded through a port not illustrated here for purposes of clarity. In some embodiments, a three-way solenoid valve is used to provide pressurized fluid 308 to first piston cylinder 306 and then to shut off pressurized fluid 308 from first piston cylinder 306 and to allow the fluid within first piston cylinder 306 to be discarded.

Figure 4A:
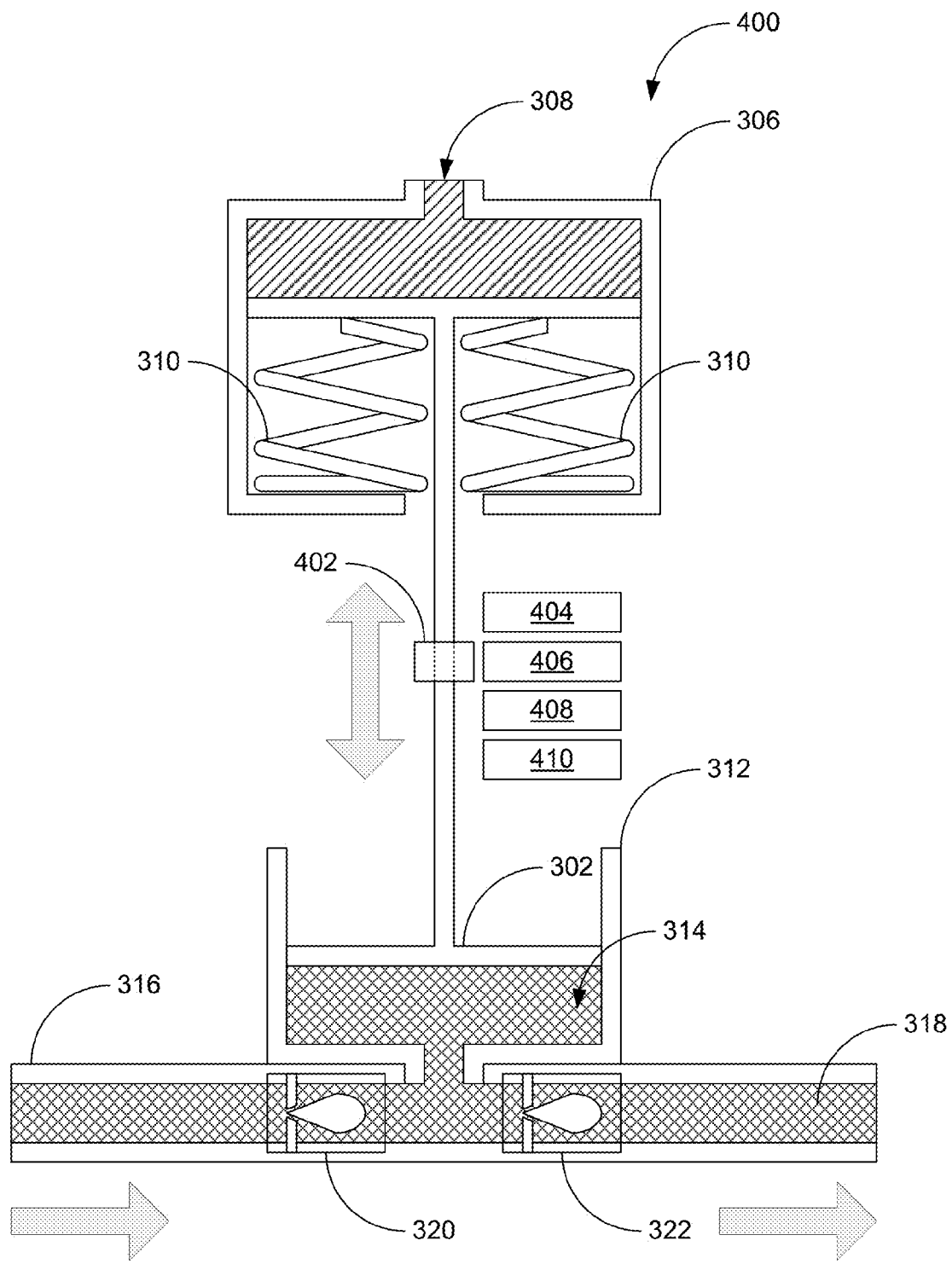
FIGS. 4A, 4B, and 4C are block diagrams illustrating a fluid additive injection system.
Figure 4B:
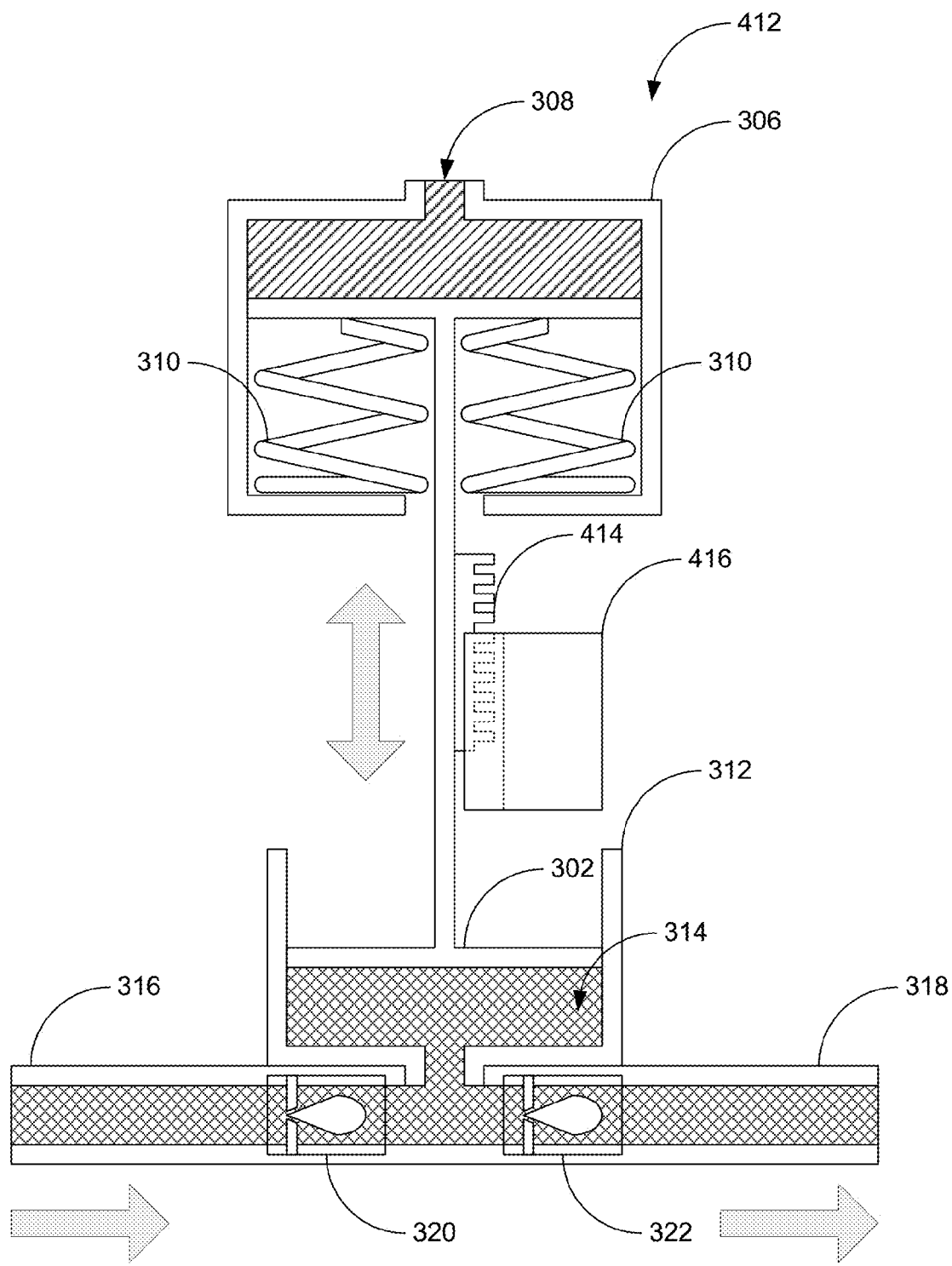
Figure 4C:
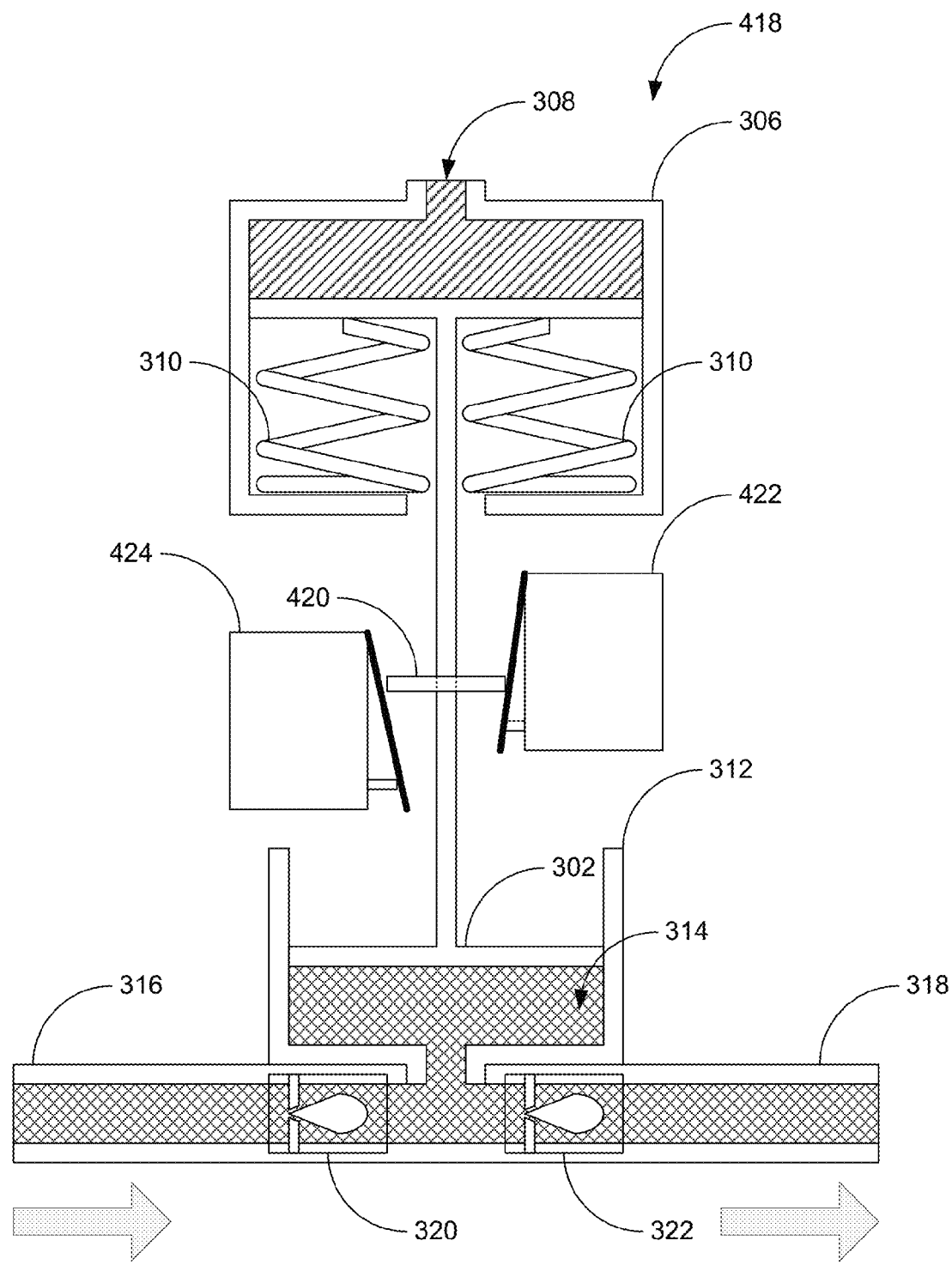

FIGS. 4A, 4B, and 4C are block diagrams illustrating a fluid additive injection system such as resides within the fluid injection system 120 illustrated in FIG. 1. In these example fluid additive injection systems 400, a variety of different piston position sensors are illustrated. Many different types of position sensors are configurable for operation within the illustrated system, however, for purposes of brevity, only three different sensors are illustrated in FIGS. 4A, 4B, and 4C.

FIG. 4A illustrates a fluid additive injection system 400 where the piston position sensor includes four reed switches 404, 406, 408, and 410. These reed switches are activated by magnet 402 attached to piston 302. As piston 302 moves from its initial position to the intermediate position illustrated here, magnet 402 moves past the four reed switches activating each one in turn. The outputs from the reed switches are transmitted as control signals to a fluid additive control system.

In the example illustrated in FIG. 4A, piston 302 has moved from its initial position to a position where reed switch 406 is activated by magnet 402. Control signals from the four reed switches to the fluid additive control switches will indicate to the fluid additive control system that piston 302 has moved a sufficient amount to activate reed switch 406. This position correlates to a pre-determined amount of fluid additive 314 that has been injected into the fluid dispensation system.

At this point, if the desired quantity of fluid additive has been injected, the fluid additive control system will deactivate the valve controlling pressurized fluid 308, allowing the fluid within first piston cylinder 306 to be discarded as resilient members 310 return piston 302 to its initial position.

FIG. 4B illustrates a fluid additive injection system 412 where the piston position sensor includes opto-electronic device 416, and encoder 414 attached to piston 302. This sensor is activated by encoder 414 attached to piston 302. As piston 302 moves from its initial position to the intermediate position illustrated here, encoder 414 moves through opto-electronic device 416 alternatively blocking and admitting light to encoder 414. Opto-electronic device 416 may be any of a wide variety of opto-electronic devices capable of detecting movement of piston 302 as represented by encoder 414. For example, opto-electronic device may be as simple as an infrared transmitter/receiver pair configured to pass infrared light through the teeth of encoder 414, or as complex as the workings of an optical mouse configured to detect the motion of encoder 414, or of piston 302 directly. The outputs from the optical-electronic device are transmitted as control signals to a fluid additive control system.

In the example illustrated in FIG. 4B, piston 302 has moved from its initial position to a position where about half of encoder 414 has passed into opto-electronic device 416. Control signals from opto-electronic device 416 to the fluid additive control switches will indicate to the fluid additive control system that piston 302 has moved an amount related to the number of teeth in encoder 414 that have moved past the sensor of opto-electronic device 416. This position correlates to a pre-determined amount of fluid additive 314 that has been injected into the fluid dispensation system.

At this point, if the desired quantity of fluid additive has been injected, the fluid additive control system will deactivate the valve controlling pressurized fluid 308, allowing the fluid within first piston cylinder 306 to be discarded as resilient members 310 return piston 302 to its initial position.

FIG. 4C illustrates a fluid additive injection system 418 where the piston position sensor includes two switches 422 and 424. These switches are activated by a disc 420 attached to piston 302. As piston 302 moves from its initial position to the intermediate position illustrated here, disc 420 moves past the two switches, activating each one in turn. In other embodiments, other quantities and configurations of switches may be used to detect motion of piston 302. The outputs from the switches are transmitted as control signals to a fluid additive control system.

In the example illustrated in FIG. 4C, piston 302 has moved from its initial position to a position where switch 422 is activated by disc 420 but switch 424 has not yet been activated. Control signals from the two switches to the fluid additive control switches will indicate to the fluid additive control system that piston 302 has moved a sufficient amount to activate switch 422. This position correlates to a pre-determined amount of fluid additive 314 that has been injected into the fluid dispensation system.

At this point, if the desired quantity of fluid additive has been injected, the fluid additive control system will deactivate the valve controlling pressurized fluid 308, allowing the fluid within first piston cylinder 306 to be discarded as resilient members 310 return piston 302 to its initial position.

Figure 5:
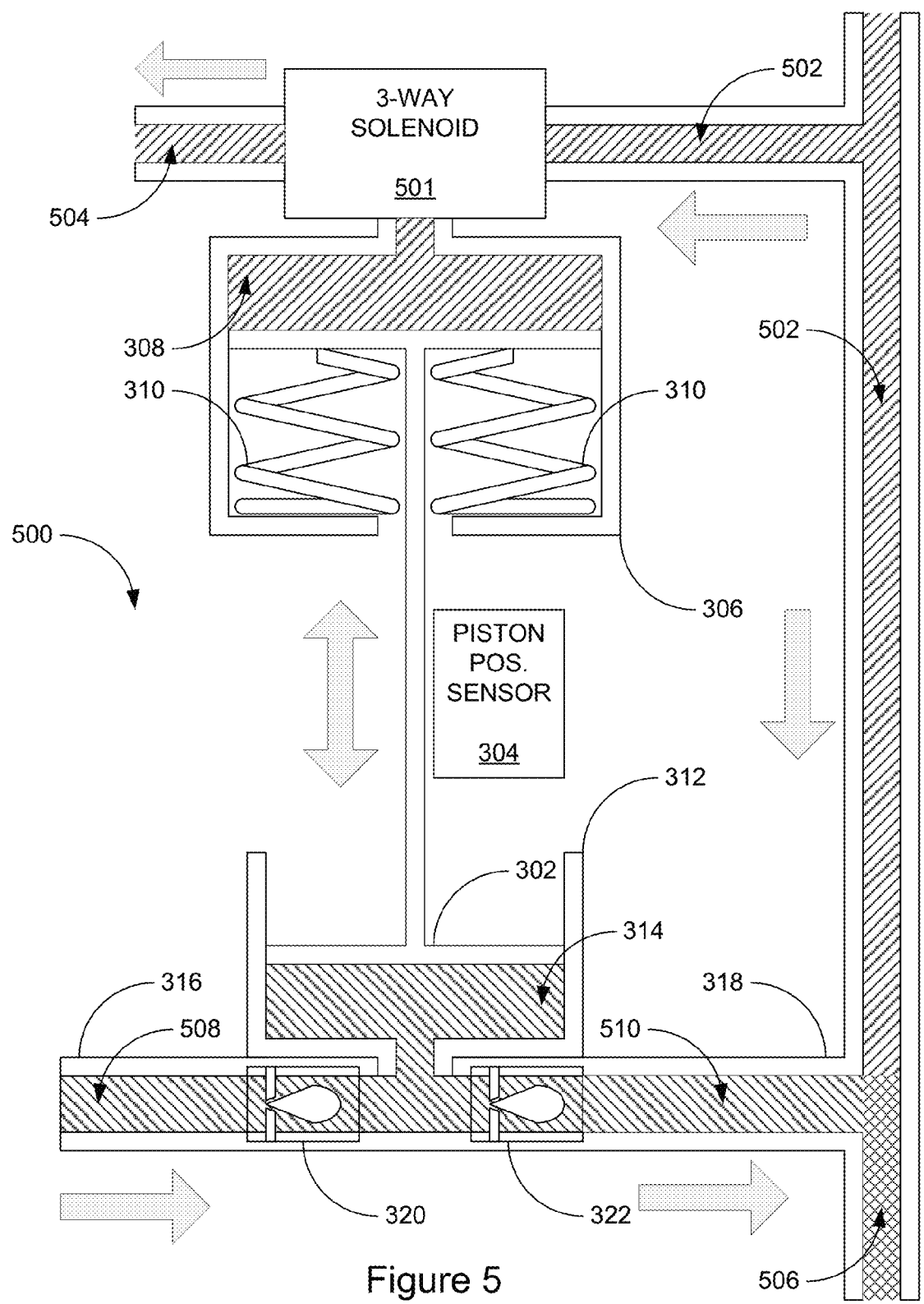
FIG. 5 is a block diagram illustrating a fluid additive injection system.

FIG. 5 is a block diagram illustrating a fluid additive injection system such as resides within the fluid injection system 120 illustrated in FIG. 1. This example fluid additive injection system 500 includes the system illustrated in FIG. 3B along with associated plumbing. In this example, three-way solenoid 501 is used to control the flow of pressurized fluid 502 into first piston cylinder 306. When three-way solenoid 501 is activated, a path between pressurized fluid 502 and first piston cylinder 306 is opened and first piston cylinder 306 begins to fill with pressurized fluid 308.

When three-way solenoid 501 is deactivated the path between pressurized fluid 502 and first piston cylinder 306 is closed and a path between waste port 504 and first piston cylinder 306 is opened. This allows resilient members 310 to return piston 302 to its initial position by expelling fluid 308 through waste port 504.

When three-way solenoid 501 is activated, piston 302 moves from its initial position and begins injecting fluid additive 314 from second piston cylinder 312 into pressurized fluid 502 through one-way valve 322 and output port 318. This results in pressurized fluid plus additive 506.

When three-way solenoid 501 is deactivated, resilient members 310 act to return piston 302 to its initial position creating a partial vacuum in second piston cylinder 312. This vacuum operates to draw fresh fluid additive 508 through input port 316 and one-way valve 320 into second piston cylinder 312.

Figure 6:
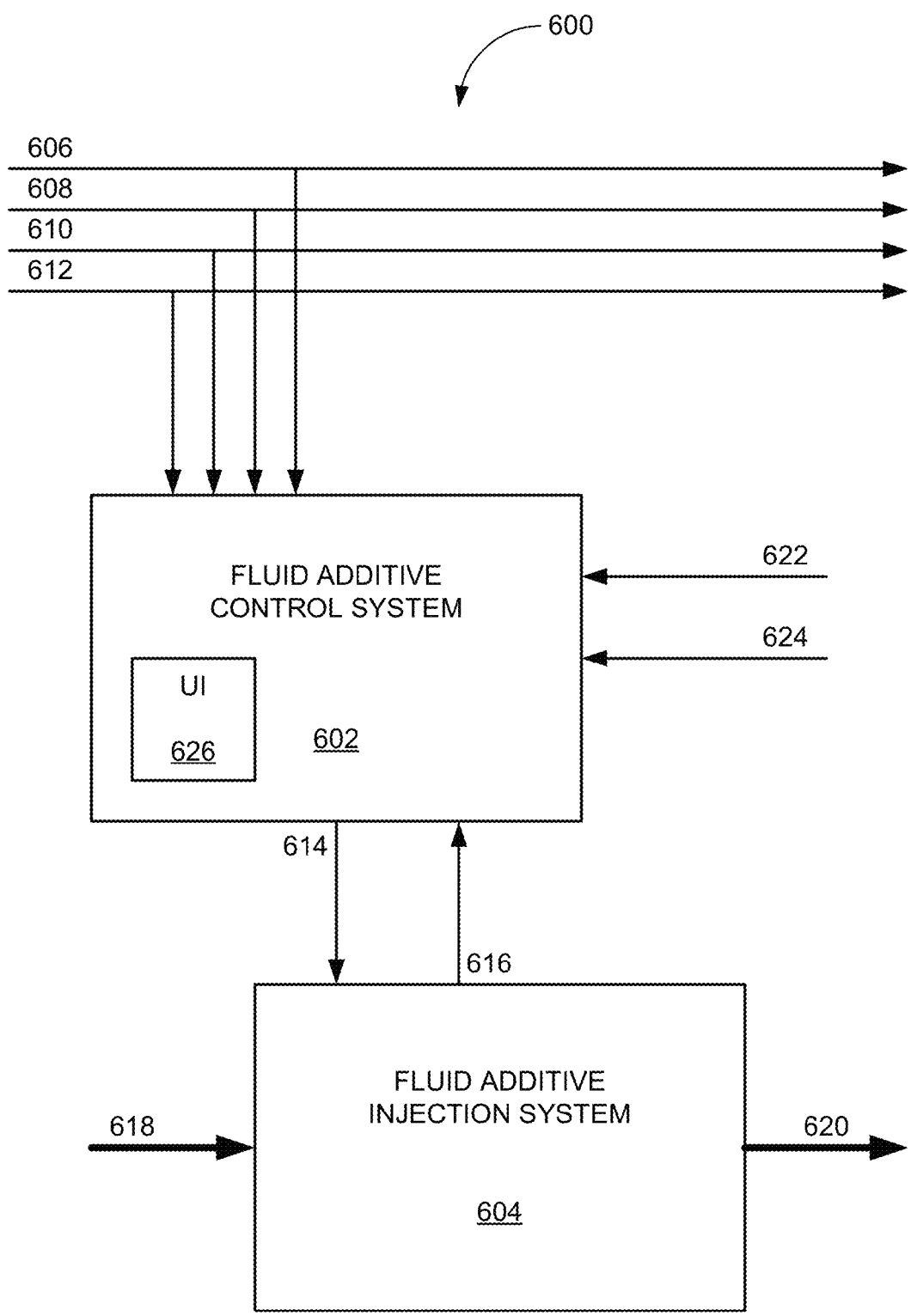
FIG. 6 is a block diagram illustrating a portion of a fluid dispensation system.

FIG. 6 is a block diagram illustrating a portion of a fluid dispensation system such as resides within fluid injection system 120 illustrated on FIG. 1. FIG. 6 illustrates a portion of the fluid dispensation system illustrated in FIG. 2. In this example fluid dispensation system 600, four control lines 606, 608, 610, and 612 to four valves are shown. These control lines 606, 608, 610, and 612 are also configured to connect to fluid additive control system 602. Fluid additive control system 602 communicates with fluid additive injection system 604 through control lines 614 and 616.

Fluid additive injection system 604 receives pressurized fluid 618, injects a fluid additive to it, resulting in pressurized fluid plus additive 620. Fluid additive control system also receives two additional control signals 622 and 624 from external sources, and also includes user interface 626 to allow a user to program the fluid additive injection system.

Fluid additive control system 602 monitors control lines 606, 608, 610, and 612 and any activation of any of these control lines will be detected by fluid additive control system 602. When one of the four control lines 606, 608, 610, and 612 is activated, fluid additive control system 602 determines a fluid additive quantity based on the identity of the control line and the fluid dispensation devices controlled by that particular control line. For example, control line 606 may correspond to zone A, 608 may correspond to zone B, 610 may correspond to zone C, and 612 may correspond to zone D. When control line 608 is activated, fluid additive control system 602 determines an amount of fluid additive to be injected into the pressurized fluid for dispensation into zone B.

Different zones may require different amounts of fluid additive. These amounts may be input by a user through user interface 626 or through control port 622. Control port 622 may be coupled with a user's computer or other device allowing remote configuration of fluid dispensation system 600. In some embodiments, control port 622 may be wirelessly coupled to fluid additive control system 602. In other embodiments, control port 622 may be used by a user to override quantities of fluid additive entered through user interface 626.

When fluid additive control system 602 has detected that one of the zones or fluid dispensation devices has become active, it sends a control signal over control line 614 to fluid additive injection system activating fluid additive injection system 604, which then begins injecting the fluid additive into pressurized fluid 618. As fluid additive injection system 604 is injecting fluid additive, it is also sending control signals to fluid additive control system 602 through control line 616 from a piston position sensor.

Through the control signals arriving over control line 616, fluid additive control system 602 monitors the amount of fluid additive that is being injected into pressurized fluid 618. When the control signals indicate that the proper amount of fluid additive has been injected, fluid additive control system 602 sends a control signal over control line 614 deactivating fluid additive injection system 604.

The amount of fluid additive injected may be any quantity. For example, in one zone it may correspond to one-half of a piston stroke of additive, while in another zone it may correspond to three-quarters of a piston stroke of additive. In other examples, one zone may require multiple piston strokes of additives in addition to a partial piston stroke of additive. These amounts may all be set by a user through control line 622 or user interface 626.

In some examples, additional control lines 624 may be used to receive external signals such as time, temperature, humidity, wind speed, or the like that may be used by fluid additive control system to modify the quantity of fluid additive injected into pressurized fluid 618.

FIGS. 7A and 7B are illustrations of exemplary control signals used by a fluid additive control system such as resides within fluid injection system 120 illustrated in FIG. 1. FIGS. 7A and 7B illustrate exemplary control signals such as those produced by fluid injection system 418 illustrated in FIG. 4C. In the example illustrated in FIG. 7A, fluid injection system 418 includes two switches 422 and 424 each of which is coupled with the fluid additive control system. First control signal 700 is the control signal indicating that a fluid dispensation device or zone within a fluid dispensation system is active. For example, this control signal may correspond to one of the four control lines 606, 608, 610, and 612 illustrated in FIG. 6. In this example, when first control line 700 is high one or more fluid dispensation devices are active.

Second control line 702 is the control line going to three-way solenoid 502 in FIG. 5. In some embodiments, when second control line 702 is high or active, the fluid injection system is activated and when second control line 702 is low or inactive, the fluid injection system in deactivated. Third control line 704 is the control line coupling switch 422 to the fluid additive control system, and fourth control line 706 is the control line coupling switch 424 to the fluid additive control system.

In this example, at time t1, first control line 700 goes high indicating that a fluid dispensation device within the fluid dispensation system is active. At this time the fluid additive control system determines a fluid additive quantity to be injected into the fluid dispensation system based on the identity of the activated fluid dispensation device. This may be determined from the identity of the first control line 700 that has been activated.

At time t2, the fluid additive control system activates second control line 702 which in turn activates the fluid additive injection system, which begins injecting the fluid additive into the fluid dispensation system. At time t3, piston 302 has moved sufficiently far to activate switch 422 which in turn activates third control line 704. The fluid additive control system receives the signal from third control line 704 and determines that the fluid additive quantity has been injected into the fluid dispensation system at that point in time.

In response to the activation of third control line 704, the fluid additive control system deactivates second control line 702 at time t4, and piston 302 begins to return to its initial position. At time t5, piston 302 has returned far enough that switch 422 is no longer activated. At time t6, the fluid dispensation device is deactivated.

In the example illustrated in FIG. 7B, fluid injection system 418 includes two switches 422 and 424 each of which is coupled with the fluid additive control system. First control signal 710 is the control signal indicating that a fluid dispensation device or zone within a fluid dispensation system is active. For example, this control signal may correspond to one of the four control lines 606, 608, 610, and 612 illustrated in FIG. 6. In this example when first control line 710 is high one or more fluid dispensation devices are active.

Second control line 712 is the control line going to three-way solenoid 502 in FIG. 5. When second control line 712 is high, the fluid injection system is activated and when second control line 712 is low, the fluid injection system in deactivated. Third control line 714 is the control line coupling switch 422 to the fluid additive control system, and fourth control line 716 is the control line coupling switch 424 to the fluid additive control system.

In this example, at time t1, first control line 710 goes high indicating that a fluid dispensation device within the fluid dispensation system is active. At this time the fluid additive control system determines a fluid additive quantity to be injected into the fluid dispensation system based on the identity of the activated fluid dispensation device. This may be determined from the identity of the first control line 710 that has been activated.

At time t2, the fluid additive control system activates second control line 712 which in turn activates the fluid additive injection system, which begins injecting the fluid additive into the fluid dispensation system. At time t3, piston 302 has moved sufficiently far to activate switch 422 which in turn activates third control line 714. The fluid additive control system receives the signal from third control line 714 and determines that the fluid additive quantity has not yet been injected into the fluid dispensation system at that point in time.

At time t4, piston 302 has moved sufficiently far to activate switch 424 which in turn activates fourth control line 716. The fluid additive control system receives the signal from fourth control line 716 and determines that the fluid additive quantity has been injected into the fluid dispensation system at that point in time.

In response to the activation of fourth control line 716, the fluid additive control system deactivates second control line 712 at time t5, and piston 302 begins to return to its initial position. At time t6, piston 302 has returned far enough that switch 424 is no longer activated. At time t7, the fluid dispensation device is deactivated.

The methods, systems, devices, processors, equipment, and servers described above may be implemented with, contain, or be executed by one or more computer systems. The methods described above may also be stored on a computer readable medium for execution by a computer system. Many of the elements of fluid injection system 120 may be, comprise, or include computer systems. This includes, but is not limited to, fluid additive control system 602. These computer systems are illustrated, by way of example, in FIG. 8.

Figure 8:
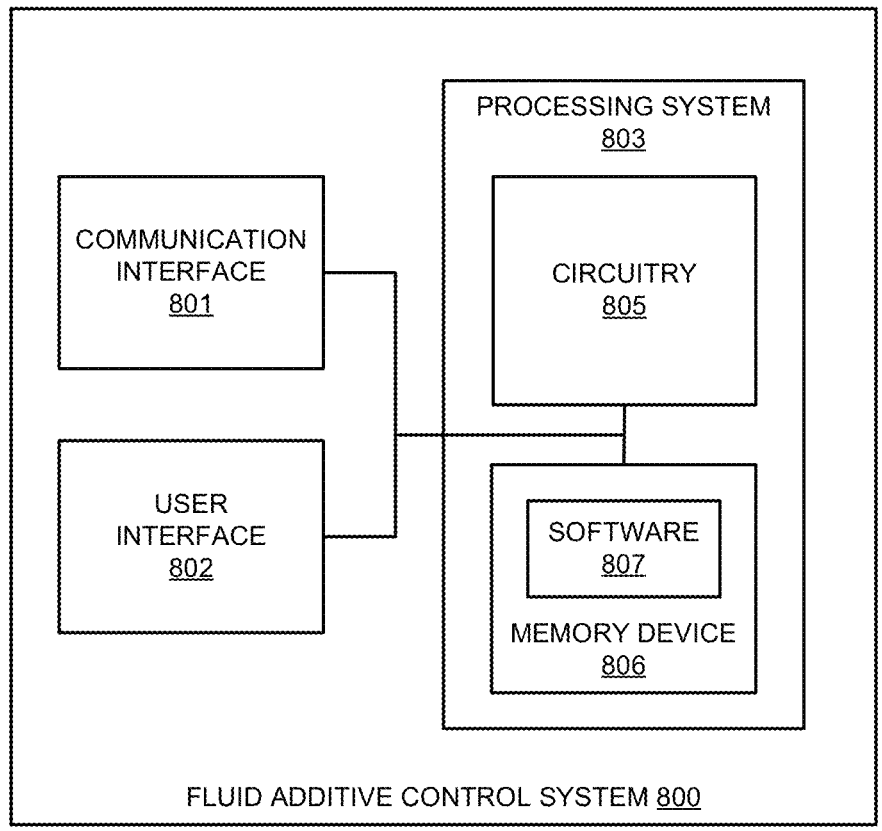
FIG. 8 is a block diagram illustrating a fluid additive control system.

FIG. 8 is a block diagram illustrating a fluid additive control system 800 that may be utilized by the fluid dispensation system described herein and illustrated in FIGS. 1 and 6. The fluid dispensation system is implemented with fluid additive control system 800, as shown in FIG. 8. Fluid additive control system 800 includes communication interface 801, user interface 802, and processing system 803. Processing system 803 is linked to communication interface 801 and user interface 802 through a bus. Processing system 803 includes processing circuitry 805 and memory device 806 that stores operating software 807.

Communication interface 801 includes components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 includes components that interact with a user. User interface 802 may include a keyboard, display screen, mouse, touch pad, or some other user input/output apparatus. User interface 802 may be omitted in some examples.

Processing circuitry 805 includes microprocessor and other circuitry that retrieves and executes operating software 807 from memory device 806. Memory device 806 includes a disk drive, flash drive, data storage circuitry, or some other memory apparatus. Operating software 807 includes computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate fluid additive control system 800 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a fluid additive control system to inject a fluid additive into a fluid dispensation system comprising:
   receiving a first control signal indicating that a fluid dispensation device within the fluid dispensation system is active;
   determining a fluid additive quantity based upon the identity of the fluid dispensation device;
   instructing a fluid additive injection system to inject the fluid additive into the fluid dispensation system in response to the activation and to maintain backpressure on the fluid additive to sustain a steady injection flowrate and prevent backflow;
   receiving a second control signal from the fluid additive injection system when the fluid additive quantity for the fluid dispensation device has been injected into the fluid dispensation system; and
   deactivating the fluid additive injection in response to the second control signal,
   wherein instructing the fluid additive injection system comprises activating a valve coupled to a pressurized fluid;
   wherein activating the valve comprises receiving pressurized fluid from a pressurized fluid supply and transmitting the pressurized fluid into a piston cylinder coupled with a piston; and
   wherein the pressurized fluid moves the piston from an initial position, injecting fluid additive into the fluid dispensation system in response to the pressurized fluid entering the piston cylinder.

2. The method of claim 1,
   wherein instructing the fluid injection system comprises transmitting the second control signal from a piston position sensor when the piston has injected the fluid additive quantity of the fluid additive into the fluid dispensation system.

3. The method of claim 2,
   wherein deactivating the fluid additive injection system comprises deactivating the valve; and
   wherein deactivating the valve comprises releasing the pressurized fluid from the piston cylinder, allowing the piston to return to the initial position.

4. The method of claim 1,
wherein the fluid additive is selected from a group consisting of liquid fertilizer, liquid herbicide, liquid pesticide, liquid fungicide, a wetting agent solution, and a mixture thereof.

5. A fluid additive system for injecting a fluid additive into a fluid dispensation system comprising:
  a communication interface configured to receive and transmit control signals;
  a processing system coupled to the communication interface, and configured to:
    receive a first control signal through the communication interface indicating that a fluid dispensation device within the fluid dispensation system is active;
    determine a fluid additive quantity based on the identity of the fluid dispensation device;
    transmit a second control signal to a fluid additive injection system through a communication interface, wherein the second control signal activates the fluid additive injection system, and the fluid additive injection system injects the fluid additive into the fluid dispensation system in response to the activation;
    maintain backpressure on the fluid additive to sustain a steady injection flowrate and prevent backflow in response to the activation;
    receive a third control signal from the fluid additive injection system through the communication interface when the fluid additive quantity for the fluid dispensation device has been injected into the fluid dispensation system;
    transmit a fourth control signal to the fluid additive injection system through the communication interface in response to the second control signal, wherein the fourth control signal deactivates the fluid additive injection system; and
    receive a fifth control signal, and determine the fluid additive quantity based on the identity of the fluid dispensation device and the fifth control signal.

6. The fluid injection system of claim 5,
wherein the communication interface also comprises a user interface configured to allow a user to input desired fluid additive quantities for one or more of the fluid dispensation devices.

\* \* \* \* \*